United States Patent
Sawada

(10) Patent No.: US 12,461,290 B2
(45) Date of Patent: Nov. 4, 2025

(54) MOLDED PRODUCT AND DISPLAY DEVICE

(71) Applicant: Mitsubishi Chemical Corporation, Tokyo (JP)

(72) Inventor: Tadayoshi Sawada, Tokyo (JP)

(73) Assignee: Mitsubishi Chemical Corporation, Tokyo (JP)

(*) Notice: Subject to any disclaimer, the term of this patent is extended or adjusted under 35 U.S.C. 154(b) by 622 days.

(21) Appl. No.: 17/816,516

(22) Filed: Aug. 1, 2022

(65) Prior Publication Data

US 2022/0373727 A1    Nov. 24, 2022

Related U.S. Application Data

(63) Continuation of application No. PCT/JP2021/011520, filed on Mar. 19, 2021.

(30) Foreign Application Priority Data

Mar. 24, 2020    (JP) .................. 2020-052857

(51) Int. Cl.
  *G02B 5/22*    (2006.01)
  *G02B 1/04*    (2006.01)

(52) U.S. Cl.
  CPC .............. *G02B 5/223* (2013.01); *G02B 1/04* (2013.01)

(58) Field of Classification Search
  CPC . G02B 5/223; G02B 1/04; G02B 5/22; C08K 5/0041; C08K 2201/014;
  (Continued)

(56) References Cited

U.S. PATENT DOCUMENTS

| | | | |
|---|---|---|---|
| 2004/0102563 A1* | 5/2004 | Schottland | C08K 5/0041 524/495 |
| 2010/0243970 A1 | 9/2010 | Toshimitsu et al. | |

(Continued)

FOREIGN PATENT DOCUMENTS

| | | |
|---|---|---|
| CN | 103380176 A | 10/2013 |
| CN | 105358625 A | 2/2016 |

(Continued)

OTHER PUBLICATIONS

International Search Report issued May 25, 2021 in PCT/JP2021/011520 filed on Mar. 19, 2021, 4 pages (with English Translation).
Japanese Office Action issued Apr. 19, 2022 in Japanese Patent Application No. 2021-523333, 4 pages (with English Machine Translation).

(Continued)

*Primary Examiner* — Balram T Parbadia
(74) *Attorney, Agent, or Firm* — Oblon, McClelland, Maier & Neustadt, L.L.P.

(57) ABSTRACT

Provided is a molded product which exhibits an excellent jet black color in a case where a light source is turned off, can exhibit a specific color tone in a case where the light source is turned on, and has a high solar transmittance. The molded product of the present invention is a molded product comprising a transparent resin, in which an L* value of reflected light is 35 or less, in a wavelength range of 430 nm or more and 700 nm or less, a wavelength at which a maximum value of a light transmittance is shown is in a wavelength range of 430 nm or more and less than 680 nm, and a light transmittance at a wavelength of 770 nm is 0.5% or more.

18 Claims, 5 Drawing Sheets

(58) Field of Classification Search
CPC ...... C08K 2201/019; C08K 5/08; C08K 5/18; C08K 5/3465; C08K 5/20; C08L 33/10; C09B 57/00
See application file for complete search history.

(56) References Cited

U.S. PATENT DOCUMENTS

| | | | |
|---|---|---|---|
| 2012/0308724 | A1 | 12/2012 | Hellring et al. |
| 2013/0331514 | A1 | 12/2013 | Kaito et al. |
| 2015/0247037 | A1* | 9/2015 | Sugioka ............... C08L 67/02 525/68 |
| 2018/0003871 | A1 | 1/2018 | Sawada et al. |
| 2021/0003768 | A1 | 1/2021 | Sechi et al. |
| 2022/0355584 | A1 | 11/2022 | Wang et al. |

FOREIGN PATENT DOCUMENTS

| | | | |
|---|---|---|---|
| CN | 107111027 | A | 8/2017 |
| CN | 109835041 | A | 6/2019 |
| CN | 109891277 | A | 6/2019 |
| CN | 110476009 | A | 11/2019 |
| EP | 3 236 297 | A1 | 10/2017 |
| JP | 08-044049 | A | 2/1996 |
| JP | 2009-069822 | A | 4/2009 |
| JP | 2011-012247 | A | 1/2011 |
| JP | 2014-169432 | A | 9/2014 |
| WO | WO 2016/098746 | A1 | 6/2016 |
| WO | WO 2020/263737 | A1 | 12/2020 |

OTHER PUBLICATIONS

Japanese Decision of Rejection issued Jul. 5, 2022 in Japanese Patent Application No. 2021-523333, 4 pages (with English Machine Translation).
Combined Chinese Office Action and Search Report issued Feb. 29, 2024 in Chinese Application 202180014093.1, (with unedited computer-generated English translation), 22 pages.
Extended European Search Report Issued Aug. 22, 2023 in European Application 21776434.9, (submitting English translation only), 9 pages.
Anonymous: "CIELAB color space-Wikipedia", XP055561160, 2019, Retrieved from the Internet: URL:https://en.wikipedia.org/wiki/CIELAB_color_space [retrieved on Feb. 25, 2019], 10 pages.
Korean Office Action issued Aug. 7, 2024 in Korean Patent Application No. 10-2022-7031959 (with unedited, machine-generated English translation), 20 pages.
Combined Taiwanese Office Action and Search Report issued Dec. 3, 2024 in Taiwanese Patent Application No. 110110235, 10 pages.
"Spectra Fix Red 195 Crude", Technical Data Sheet, Spectra Colors Corporation, 4.RE.0195C0, Retrieved from the Internet: [URL: https://spectracolors.com/wp-content/uploads/2017/04/4.RE .0195C0-TDS.pdf], Jun. 21, 2013, XP093267366, 1 page.
"Solvent Green 3", Chemical Book, Retrieved from the Internet: [URL: https://www.chemicalbook.com/ ProductChemicalPropertiesCB3167663_EN.htm], Retrieved on Apr. 6, 2025, XP093267367, 2 pages.
European Office Action issued Apr. 14, 2025 in European Patent Application No. 21776434.9, 6 pages.

* cited by examiner

MOLDED PRODUCT AND DISPLAY DEVICE

This application is a continuation application of International Application No. PCT/JP2021/011520, filed on Mar. 19, 2021, which claims the benefit of priority of the prior Japanese Patent Application No. 2020-052857, filed Mar. 24, 2020, the content of which is incorporated herein by reference.

TECHNICAL FIELD

The present invention relates to a molded product and a display device.

BACKGROUND ART

In the applications of vehicle interior/exterior members, lighting lamps, and display signboards (hereinafter, also simply referred to as "vehicle interior/exterior members and the like"), there is a demand for display devices that display color tones and predetermined information required by the market. In the applications described above, since excellent appearance and weather resistance are required, a molded product obtained by molding a thermoplastic resin such as a methacrylic resin or a polycarbonate-based resin has been used.

In recent years, in the applications, vehicle interior/exterior members and the like are required to eliminate the presence by exhibiting the achromatic color tone (jet black color) of black or make steps and seams on the surface thereof inconspicuous in a case where light sources are turned off and to show the presence by exhibiting the chromatic or achromatic color tone in a case where the light sources are turned on, that is, a thermoplastic resin molded product with excellent designability is required.

Here, in a case where a dye having an absorption band in a wavelength range of 380 to 780 nm is blended with a transparent thermoplastic resin such as a methacrylic resin so that the molded product imparts a chromatic or achromatic color tone in a case where a light source is turned on, the solar transmittance is not changed in a wavelength range of more than 780 nm and 2100 nm or less, but the solar transmittance is low in a wavelength range of 380 to 780 nm, which is the light absorption band of the dye. Meanwhile, the solar reflectance is lower than the solar transmittance and shows a constant value in a wavelength range of 380 to 2100 nm. That is, the solar absorption rate, which is a value obtained by subtracting the solar transmittance and the solar reflectance from 100%, is increased by blending the dye. As a result, the risk of deformation or deterioration due to heat, or thermal cracking occurring in the thermoplastic resin molded product increases because of an increase in temperature as the solar absorption rate of the thermoplastic resin molded product increases. That is, there is a demand for a thermoplastic resin molded product having a low solar absorption rate, that is, a high solar transmittance in order to suppress thermal cracking and the like.

For example, Patent Document 1 discloses a resin molded product blended with carbon black as a method of imparting jet blackness to a thermoplastic resin molded product. Further, Patent Document 2 discloses a resin molded product blended with an organic dye.

CITATION LIST

Patent Documents

[Patent Document 1]
Japanese Unexamined Patent Application, First Publication No. 2011-12247

[Patent Document 2]
PCT International Publication No. WO2016/098746

SUMMARY OF INVENTION

Technical Problem

The resin molded product disclosed in Patent Document 1 exhibits a jet black color in a case where the light source is turned off, but is unlikely to exhibit a chromatic or achromatic color tone in a case where the light source is turned on, that is, the designability is insufficient.

Since the resin molded product disclosed in Patent Document 2 exhibits an excellent jet black color in the case where the light source is turned off and can exhibit a specific color tone in the case where the light source is turned on, the resin molded product has excellent designability, but has a problem of a low solar transmittance.

Under the above-described circumstances, an object of the present invention is to provide a molded product which exhibits an excellent jet black color in a case where a light source is turned off, can exhibit a specific color tone in a case where the light source is turned on, and has a high solar transmittance.

Solution to Problem

According to a first aspect of the present invention, there is provided a molded product including a transparent resin, in which an L* value of reflected light is 35 or less, in a wavelength range of 430 nm or more and 700 nm or less, a wavelength at which a maximum value of a light transmittance is shown is in a wavelength range of 430 nm or more and 680 nm or less, and a light transmittance at a wavelength of 770 nm is 0.5% or more.

The present invention includes the following aspects without limitation.

[1] A molded product comprising:
a transparent resin,
wherein an L* value of reflected light is 35 or less,
in a wavelength range of 430 nm or more and 700 nm or less, a wavelength at which a maximum value of a light transmittance is shown is in a wavelength range of 430 nm or more and less than 680 nm, and
a light transmittance at a wavelength of 770 nm is 0.5% or more.

[2] The molded product according to [1], further comprising:
two or more kinds of light absorbing agents (L) having different wavelengths at which a maximum value of an absorbance is shown in a wavelength range of 380 nm or more and 730 nm or less.

[3] The molded product according to [2],
wherein the molded product comprises a light absorbing agent (B) having a wavelength at which the maximum value of the absorbance is shown in a wavelength range of 630 nm or more and 700 nm or less, as the light absorbing agent (L).

[4] The molded product according to [2] or [3],
wherein the molded product does not comprise a light absorbing agent having a wavelength at which the maximum value of the absorbance is shown in a wavelength range of more than 720 nm, as the light absorbing agent (L).

[5] The molded product according to any one of [1] to [4],
wherein a total light transmittance of the molded product is less than 5%.

[6] The molded product according to any one of [1] to [5],
wherein in a wavelength range of 430 nm or more and 700 nm or less, the maximum value of the light transmittance at a wavelength at which the maximum value of the light transmittance is shown is 0.1% or more.

[7] The molded product according to any one of [1] to [6], wherein the light transmittance at a wavelength of 770 nm is 1% or more.

[8] The molded product according to any one of [1] to [7], wherein the transparent resin is a methacrylic resin.

[13A] The molded product according to any one of [2] to [4], wherein the light absorbing agent (L) satisfies any of the following conditions 1 and 2, Condition 1:
only one i that satisfies Expression (5) is present, and Expression (6) is satisfied, Expression (5):

$$\lambda(i+1)-\lambda(i) \geq 160 \text{ nm} \quad (5)$$

Expression (6):

$$\lambda(1)-380 \text{ nm} < 160 \text{ nm} \quad (6)$$

Condition 2:
Expression (5) is not satisfied, and Expression (7) is satisfied,

Expression (5):

$$\lambda(i+1)-\lambda(i) \geq 160 \text{ nm} \quad (5)$$

Expression (7):

$$\lambda(1)-380 \text{ nm} \geq 160 \text{ nm} \quad (7)$$

in the expression, $\lambda(i)$ represents a wavelength of a light absorbing agent (i), which is one of the light absorbing agents (L), at which the maximum value of the absorbance is shown in a wavelength range of 380 nm or more and 730 nm or less, i represents an integer of 1 to n, n represents an integer of 2 or more and denotes the number of kinds of the light absorbing agents (L), $\lambda(n+1)$ is 730 nm, and an expression of $\lambda(1)<\lambda(2)< \ldots <\lambda(n)<\lambda(n+1)$ is satisfied.

[14] The molded product according to any one of [2] to [4], wherein the molded product comprises a light absorbing agent (A) having a wavelength at which the maximum value of the absorbance is shown in a wavelength range of 400 nm or more and less than 630 nm, as the light absorbing agent (L).

[16A] The molded product according to [14], wherein the light absorbing agent (A) includes a light absorbing agent selected from the group consisting of an anthraquinone-based coloring agent and a phthalocyanine-based coloring agent.

According to a second aspect of the present invention, there is provided a molded product obtained by molding a thermoplastic resin composition that contains a methacrylic resin and two or more kinds of light absorbing agents (L) having different wavelengths at which a maximum value of an absorbance is shown in a wavelength range of 380 nm or more and 730 nm or less, the molded product including a light absorbing agent (B) having a wavelength at which the maximum value of the absorbance is shown in a wavelength range of 630 nm or more and 700 nm or less, as the light absorbing agent (L), in which an L* value of reflected light is 35 or less, a total light transmittance of the molded product is 1% or less, in a wavelength range of 430 nm or more and 700 nm or less, a wavelength at which a maximum value of a light transmittance is shown is in a wavelength range of 430 nm or more and less than 680 nm, in a wavelength range of 430 nm or more and 700 nm or less, the maximum value of the light transmittance at a wavelength at which the maximum value of the light transmittance is shown is 0.1% or more, and the light transmittance at a wavelength of 770 nm is 5% or more.

The present invention includes the following aspects without limitation.

[9] A molded product which is obtained by molding a thermoplastic resin composition that comprises a methacrylic resin and two or more kinds of light absorbing agents (L) having different wavelengths at which a maximum value of an absorbance is shown in a wavelength range of 380 nm or more and 730 nm or less, the molded product comprising:
a light absorbing agent (B) having a wavelength at which the maximum value of the absorbance is shown in a wavelength range of 630 nm or more and 700 nm or less, as the light absorbing agent (L),
wherein an L* value of reflected light is 35 or less,
a total light transmittance of the molded product is 1% or less,
in a wavelength range of 430 nm or more and 700 nm or less, a wavelength at which a maximum value of a light transmittance is shown is in a wavelength range of 430 nm or more and less than 680 nm,
in a wavelength range of 430 nm or more and 700 nm or less, the maximum value of the light transmittance at a wavelength at which the maximum value of the light transmittance is shown is 0.1% or more, and
the light transmittance at a wavelength of 770 nm is 5% or more.

[10] The molded product according to [9], wherein the light absorbing agent (B) comprises a light absorbing agent selected from the group consisting of an anthraquinone-based dye, a perinone-based dye, a methine-based dyes, and a quinophthalone-based dye.

[11] The molded product according to [9] or [10], wherein a total content of the light absorbing agent (B) is 0.1 parts by mass or more and 0.5 parts by mass or less with respect to 100 parts by mass of the methacrylic resin.

[12] The molded product according to any one of [9] to [11], wherein the molded product does not comprise a light absorbing agent having a wavelength at which the maximum value of the absorbance is shown in a wavelength range of more than 720 nm, as the light absorbing agent (L).

[13B] The molded product according to any one of [9] to [12], wherein the light absorbing agent (L) satisfies any of the following conditions 1 and 2, Condition 1:
only one i that satisfies Expression (5) is present, and Expression (6) is satisfied, Expression (5):

$$\lambda(i+1)-\lambda(i) \geq 160 \text{ nm} \quad (5)$$

Expression (6):

$$\lambda(1)-380 \text{ nm} < 160 \text{ nm} \quad (6)$$

Condition 2:
Expression (5) is not satisfied, and Expression (7) is satisfied,

Expression (5):

$$\lambda(i+1)-\lambda(i) \geq 160 \text{ nm} \quad (5)$$

Expression (7):

$$\lambda(1)-380 \text{ nm} \geq 160 \text{ nm} \quad (7)$$

in the expression, $\lambda(i)$ represents a wavelength of a light absorbing agent (i), which is one of the light absorbing agents (L), at which the maximum value of the absorbance is shown in a wavelength range of 380 nm or more and 730 nm or less, i represents an integer of 1 to n, n represents an integer of 2 or more and denotes the number of kinds of the light absorbing agents (L), λ(n+1) is 730 nm, and an expression of λ(1)<λ(2)< . . . <λ(n)<λ(n+1) is satisfied.

[15] The molded product according to any one of [9] to [13], wherein the molded product contains a light absorbing agent (A) having a wavelength at which the maximum value of the absorbance is shown in a wavelength range of 400 nm or more and less than 630 nm, as the light absorbing agent (L), and a total content of the light absorbing agent (A) is 0.001 parts by mass or more and 1 part by mass or less with respect to 100 parts by mass of the methacrylic resin.

[16B] The molded product according to [15], wherein the light absorbing agent (A) includes a light absorbing agent selected from the group consisting of an anthraquinone-based coloring agent and a phthalocyanine-based coloring agent.

According to a third aspect of the present invention, there is provided a display device including a light source and the molded product of the present invention which is disposed to transmit light emitted from the light source.

Advantageous Effects of Invention

The molded product according to the present invention exhibits excellent jet blackness in a case where a light source is turned off, can exhibit a specific color tone in a case where the light source is turned on, and has a high solar transmittance. Therefore, the molded product of the present invention is unlikely to store heat and is unlikely to be deformed or deteriorated due to heat, or thermally cracked.

Since the display device of the present invention includes the molded product of the present invention which is disposed to transmit light emitted from a light source, the display device exhibits excellent jet blackness in a case where the light source is turned off, can exhibit a specific color tone in a case where the light source is turned on, and has a high solar transmittance. Therefore, the display device of the present invention is unlikely to store heat and is unlikely to be deformed or deteriorated due to heat, or thermally cracked.

DESCRIPTION OF EMBODIMENTS

Figure 1:
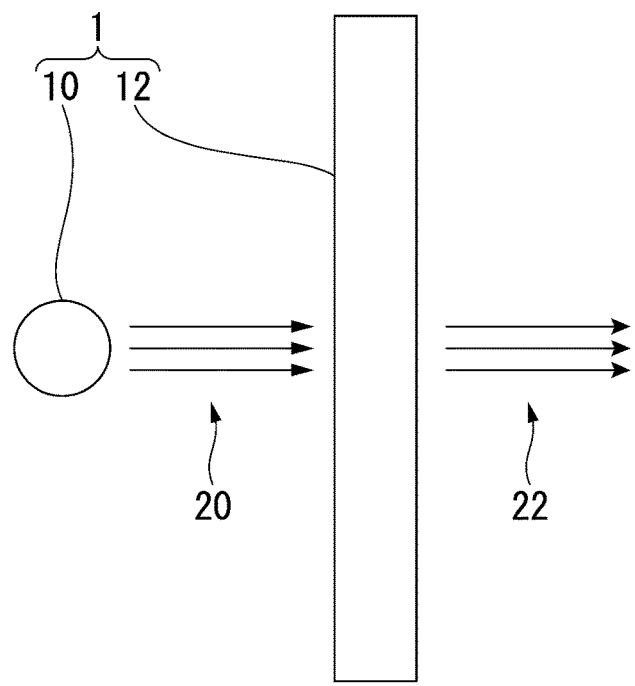
FIG. 1 is a schematic view showing an example of a display device of the present invention.

Hereinafter, embodiments of the present invention will be described.

<Molded Product>

According to a first embodiment of a molded product of the present invention, the molded product (hereinafter, also referred to as a molded product (1)) includes a transparent resin, in which an L* value of reflected light is 35 or less, in a wavelength range of 430 nm or more and 700 nm or less, a wavelength at which a maximum value of a light transmittance is shown is in a wavelength range of 430 nm or more and 680 nm or less, and a light transmittance at a wavelength of 770 nm is 0.5% or more.

The molded product (1) of the present invention exhibits an excellent jet black color in a case where a light source is turned off and selectively transmits light having a specific wavelength in a case where light emitted from a white light source is transmitted through the molded product (1) and thus can exhibit a specific color tone in a case where a light source, particularly a white light source, is turned on.

Here, white light denotes light that is a mixture of light have a plurality of wavelengths and appears to be white, and colored light denotes light having a specific wavelength in a visible light wavelength range (for example, red light or blue light).

It is desirable that the obtained molded product has excellent transparency in order to have excellent jet blackness, and the jet blackness of the obtained molded product is excellent in a case where the molded product (1) of the present invention contains a transparent resin described below.

In the molded product (1) of the present invention, the L* value of reflected light is 35 or less. In a case where the L* value of reflected light is 35 or less, the jet blackness of the molded product is excellent. The L* value thereof is preferably 30 or less.

In the present invention, the L* value of reflected light is calculated from the tristimulus values X, Y, and Z measured by spectrophotometry (integrating sphere type, reflection measurement) in conformity with ISO 11664-4.

In the molded product (1) of the present invention, in a wavelength range of 430 nm or more and 700 nm or less, a wavelength at which the maximum value of the light transmittance is shown is in a wavelength range of 430 nm or more and less than 680 nm. In a wavelength range of 430 nm or more and 700 nm or less, light having a wavelength range of 430 nm or more and less than 680 nm can be selectively transmitted so that a specific color tone is exhibited in a case where the wavelength at which the maximum value of the light transmittance is shown in a wavelength range of 430 nm or more and less than 680 nm.

In the molded product (1) of the present invention, the lower limit of the light transmittance at a wavelength of 770 nm is 0.5% or more. In a case where the light transmittance at a wavelength of 770 nm is 0.5% or more, the obtained molded product has a high solar transmittance. Therefore, the molded product is unlikely to store heat and is unlikely to be deformed or deteriorated due to heat or thermally cracked. The lower limit thereof is preferably 1% or more, more preferably 5% or more, still more preferably 20% or more, even still more preferably 40% or more, and particularly preferably 60% or more.

The upper limit of the light transmittance at a wavelength of 770 nm is not particularly limited, but is preferably 90% or less. In a case where the light transmittance at a wavelength of 770 nm is 90% or less, the jet blackness of the molded product is excellent. The upper limit thereof is more preferably 80% or less and still more preferably 75% or less.

The upper limit and the lower limit described above can be combined optionally. For example, the light transmittance of the molded product (1) at a wavelength of 770 nm is preferably 0.5% or more and 90% or less, more preferably 1% or more and 90% or less, still more preferably 5% or more and 80% or less, and particularly preferably 20% or more and 75% or less.

It is preferable that the molded product (1) of the present invention contains two or more kinds of light absorbing agents (L) having different wavelengths at which the maximum value of the absorbance is shown in a wavelength range of 380 nm or more and 730 nm or less.

In a case where the molded product (1) of the present invention contains two or more kinds of light absorbing agents (L), it is preferable that the molded product contains a light absorbing agent (B) having a wavelength at which the maximum value of the absorbance is shown in a wavelength range of 630 nm or more and 700 nm or less, as the light absorbing agent (L).

The obtained molded product can selectively transmit light having a specific wavelength in a case where a light source is turned on so that a specific color tone can be exhibited by allowing the molded product to contain the light absorbing agent (B), and thus the selectivity of color of the transmitted light is excellent. The light absorbing agent (B) will be described below.

In the molded product (1) of the present invention, the upper limit of the total light transmittance is preferably less than 5%. In a case where the total light transmittance is less than 5%, the jet blackness of the molded product is excellent. The upper limit thereof is more preferably 3% or less and more preferably 1% or less.

The lower limit of the total light transmittance is preferably 0.01% or more. In a case where the total light transmittance is 0.01% or more, light emitted from a light source, for example, a white light source can be converted into colored light after being transmitted through the molded product. The lower limit thereof is more preferably 0.02% or more and still more preferably 0.04% or more.

The upper limit and the lower limit described above can be combined optionally. For example, the total light transmittance of the molded product (1) is preferably 0.01% or more and less than 5%, more preferably 0.02% or more and 3% or less, and still more preferably 0.04% or more and 1% or less.

In the molded product (1) of the present invention, in a wavelength range of 430 nm or more and 700 nm or less, the lower limit of the maximum value of the light transmittance at a wavelength at which the maximum value of the light transmittance is shown is preferably 0.1% or more. In a wavelength range of 430 nm or more and 700 nm or less, light having a specific wavelength range of 430 nm or more and less than 680 nm can be selectively transmitted so that a specific color tone is exhibited by setting the maximum value of the light transmittance at a wavelength at which the maximum value of the light transmittance is shown, to 0.1% or more. The lower limit thereof is more preferably 0.15% or more and still more preferably 0.22% or more.

In a wavelength range of 430 nm or more and 700 nm or less, the upper limit of the maximum value of the light transmittance at a wavelength at which the maximum value of the light transmittance is shown is not particularly limited, but is preferably 5.0% or less. In a wavelength range of 430 nm or more and 700 nm or less, in a case where the maximum value of the light transmittance at a wavelength at which the maximum value of the light transmittance is shown is 5.0% or less, the jet blackness of the molded product is excellent. The upper limit thereof is more preferably 2.0% or less and still more preferably 1.0% or less.

The upper limit and the lower limit described above can be combined optionally. For example, the light transmittance of the molded product (1) at a wavelength at which the maximum value of the light transmittance is shown in a wavelength range of 430 nm or more and 700 nm or less is preferably 0.1% or more and 5.0% or less, more preferably 0.15% or more and 2.0% or less, and still more preferably 0.22% or more and 1.0% or less.

It is preferable that the molded product (1) of the present invention does not contain a light absorbing agent having a wavelength at which the maximum value of the absorbance is shown in a wavelength range of more than 720 nm, as the light absorbing agent (L). In a case where the molded product does not contain a light absorbing agent having a wavelength at which the maximum value of the absorbance is shown in a wavelength range of more than 720 nm, the solar transmittance of the obtained molded product (1) can be more efficiently increased. Therefore, the molded product (1) is unlikely to store heat and is unlikely to be deformed or deteriorated due to heat or thermally cracked.

Examples of an embodiment of the transparent resin contained in the molded product (1) of the present invention include a methacrylic resin described below.

In a case where the transparent resin is a methacrylic resin, the obtained molded product has excellent transparency, and as a result, the jet blackness is excellent.

According to a second embodiment of the molded product of the present invention, a molded product (2) is formed by molding a thermoplastic resin composition described below.

In the molded product (2) of the present invention, the L* value of reflected light is 35 or less, the total light transmittance is 1% or less, in a wavelength range of 430 nm or more and 700 nm or less, the wavelength at which the maximum value of the light transmittance is shown is in a wavelength range of 430 nm or more and less than 680 nm, in a wavelength range of 430 nm or more and 700 nm or less, the maximum value of the light transmittance at a wavelength at which the maximum value of the light transmittance is shown is 0.1% or more, and the light transmittance at a wavelength of 770 nm is 5% or more.

The molded product (2) of the present invention exhibits an excellent jet black color in a case where a light source is turned off and selectively transmits light having a specific wavelength in a case where light emitted from a white light source is transmitted through the molded product (2) and thus can exhibit a specific color tone in a case where a light source, particularly a white light source, is turned on.

The L* value of reflected light of the molded product (2) of the present invention is 35 or less and preferably 30 or less. In a case where the L* value of reflected light of the molded product is less than or equal to the above-described upper limit, the jet blackness of the molded product is excellent.

In the present invention, the U value of reflected light is calculated from the tristimulus values X, Y, and Z measured by spectrophotometry (integrating sphere type, reflection measurement) in conformity with ISO 11664-4.

The upper limit of the total light transmittance of the molded product (2) of the present invention is 1% or less. In a case where the total light transmittance is 1% or less, the jet blackness of the molded product is excellent. The upper limit thereof is preferably 0.5% or less.

The lower limit of the total light transmittance is preferably 0.01% or more. In a case where the total light transmittance is 0.01% or more, light emitted from a light source, for example, a white light source can be converted into colored light after being transmitted through the molded product. The lower limit thereof is more preferably 0.02% or more and still more preferably 0.04% or more.

The upper limit and the lower limit described above can be combined optionally. For example, the total light transmittance of the molded product (2) is preferably 0.01% or more and 1% or less and more preferably 0.02% or more and 0.5% or less.

In the present invention, the total light transmittance which is the light transmittance in a visible light wavelength range is measured in conformity with ISO 13468-1. Further, the total light transmittance of the molded product of the present invention may be a low value beyond the detection limit, but in the present invention, the hue of light emitted from a light source and transmitted through the molded product may be visually confirmed, and the hue of light emitted from the light source and transmitted through the molded product should be visually confirmed.

The molded product (2) of the present invention has a wavelength at which the maximum value of the light transmittance is shown in a wavelength range of 430 nm or more and less than 680 nm, in a wavelength range of 430 nm or more and 700 nm or less. In a wavelength range of 430 nm or more and 700 nm or less, light having a wavelength in a range of 430 nm or more and less than 680 nm can be selectively transmitted so that a specific color tone is exhibited in a case where the wavelength at which the maximum value of the light transmittance is shown in a wavelength range of 430 nm or more and less than 680 nm.

In the molded product (2) of the present invention, in a wavelength range of 430 nm or more and 700 nm or less, the lower limit of the maximum value of the light transmittance at a wavelength at which the maximum value of the light transmittance is shown is 0.1% or more. In a wavelength range of 430 nm or more and 700 nm or less, light having a specific wavelength range of 430 nm or more and less than 680 am can be selectively transmitted so that a specific color tone is exhibited by setting the lower limit of the maximum value of the light transmittance at a wavelength at which the maximum value of the light transmittance is shown, to 0.1% or more. The lower limit thereof is more preferably 0.15% or more and still more preferably 0.22% or more.

In a wavelength range of 430 nm or more and 700 nm or less, the upper limit of the maximum value of the light transmittance at a wavelength at which the maximum value of the light transmittance is shown is not particularly limited, but is preferably 5.0% or less. In a wavelength range of 430 nm or more and 700 nm or less, in a case where the maximum value of the light transmittance at a wavelength at which the maximum value of the light transmittance is shown is 5.0% or less, the jet blackness of the molded product is excellent. The upper limit thereof is more preferably 2.0% or less and still more preferably 1.0% or less.

The upper limit and the lower limit described above can be combined optionally. For example, the light transmittance of the molded product (2) at a wavelength at which the maximum value of the light transmittance is shown in a wavelength range of 430 nm or more and 700 nm or less is preferably 0.1% or more and 5.0% or less, more preferably 0.15% or more and 2.0% or less, and still more preferably 0.22% or more and 1.0% or less.

In the molded product (2) of the present invention, the lower limit of the light transmittance at a wavelength of 770 nm is 5% or more. In a case where the light transmittance at a wavelength of 770 nm is 5% or more, the obtained molded product has a high solar transmittance. Therefore, the molded product is unlikely to store heat and is unlikely to be deformed or deteriorated due to heat or thermally cracked. The lower limit thereof is preferably 20% or more, more preferably 40% or more, and still more preferably 60% or more.

The upper limit of the light transmittance at a wavelength of 770 nm is not particularly limited, but is preferably 90% or less. In a case where the light transmittance at a wavelength of 770 nm is 90% or less, the jet blackness of the molded product is excellent. The upper limit thereof is more preferably 80% or less and still more preferably 75% or more.

The upper limit and the lower limit described above can be combined optionally. For example, the light transmittance of the molded product (2) at a wavelength of 770 nm is preferably 5% or more and 90% or less, more preferably 20% or more and 80% or less, and still more preferably 40% or more and 75% or less.

In the present invention, the light transmittance in a wavelength range of 380 nm or more and 770 nm or less is measured by allowing light having a wavelength of 380 nm or more and 780 nm or less to be transmitted from the rear surface of the molded product and allowing the light to be transmitted from the front surface of the molded product using a spectrophotometer.

The thermoplastic resin composition used in the molded product (2) of the present invention contains two or more kinds of light absorbing agents (L) having different wavelengths at which the maximum value of the absorbance is shown in a wavelength range of 380 nm or more and 730 nm or less. The molded product contains the light absorbing agent (B) having a wavelength at which the maximum value of the absorbance is shown in a wavelength range of 630 nm or more and 700 nm or less, as the light absorbing agent (L). It is preferable that the molded product (2) of the present invention does not contain a light absorbing agent having a wavelength at which the maximum value of the absorbance is shown in a wavelength range of more than 720 nm, as the light absorbing agent (L). In a case where the molded product does not contain a light absorbing agent having a wavelength at which the maximum value of the absorbance is shown in a wavelength range of more than 720 nm, the solar transmittance of the obtained molded product (2) can be more efficiently increased. Therefore, the molded product is unlikely to store heat and is unlikely to be deformed or deteriorated due to heat or thermally cracked.

The thickness of the molded product (2) of the present invention in a direction in which light emitted from the light source is transmitted is preferably 0.01 mm or more and 100 mm or less and more preferably 0.1 mm or more and 10 mm or less. The jet blackness of the molded product is excellent in a case where the thickness of the molded product is more than or equal to the above-described lower limit, and the intensity of transmitted light of the molded product is excellent in a case where the thickness thereof is less than or equal to the above-described upper limit.

[Method of Producing Molded Product]

The method of producing the molded product (1) and the molded product (2) of the present invention will be described.

It is preferable that the molded product (1) of the present invention is obtained by molding a resin composition containing a transparent resin and a light absorbing agent (L) described below. It is preferable that the molded product (2) of the present invention is obtained by molding a thermoplastic resin composition of the present invention described below.

As a method of molding the molded product, a known method can be employed, and examples thereof include a molding method such as extrusion molding, injection molding, blow molding, or press molding.

<Thermoplastic Resin Composition>

The thermoplastic resin composition is one of constituent components of the molded product (2) of the present invention.

The thermoplastic resin composition in the present invention contains a methacrylic resin and a light absorbing agent (L) described below.

<Transparent Resin>

The transparent resin is one of constituent components of the molded product (1) of the present invention.

The transparent resin used in the molded product (1) of the present invention is not particularly limited as long as the transparent resin has a high light transmittance in a visible light region, and a known transparent thermoplastic resin can be used. Examples of the transparent resin include a transparent thermoplastic resin having a total light transmittance of 70% or more which is measured in conformity with ISO 13468 and having a haze value of 15% or less which is measured in conformity with ISO 14782. Specific examples thereof include a methacrylic resin, a polycarbonate-based resin, a polystyrene-based resin, and a methyl methacrylate-styrene-based resin (MS resin). In the molded product (1) of the present invention, only one or a mixture of two or more kinds of resins may be used by being selected from the above-described transparent thermoplastic resins according to desired characteristics. In particular, the methacrylic resin is excellent in transparency, weather resistance, and impact resistance.

The weight-average molecular weight and the number average molecular weight of the transparent resin can be appropriately set by those skilled in the art using a well-known technique, for example, according to the method of molding the molded product, processing conditions for the molded product, and the intended use of the molded product.

The transparent resin may contain additives such as an impact strength modifier, a release agent, an ultraviolet absorbing agent, a polymerization inhibitor, an antioxidant, and a flame retardant within a range where the effects of the present invention are not impaired.

[Methacrylic Resin]

The methacrylic resin is an embodiment of the transparent resin used in the molded product (1) of the present invention. Further, the methacrylic resin is one of constituent components of the thermoplastic resin composition used in the molded product (2) of the present invention.

Examples of the methacrylic resin include a homopolymer of methyl methacrylate (hereinafter, also referred to as "MMA") and an MMA copolymer in which the content of a repeating unit derived from MMA (hereinafter, also referred to as an "MMA unit") is 70% by mass or more and less than 100% by mass with respect to the total mass of the methacrylic resin.

The MMA copolymer in the present invention has 70% by mass or more and less than 100% by mass of the MMA unit and more than 0% by mass and 30% by mass or less of repeating units derived from other monomers described below (hereinafter, also referred to as "other monomer units").

The other monomers are not particularly limited as long as the monomers can be copolymerized with MMA, and examples thereof include known (meth)acrylic acid ester compounds such as methyl acrylate, ethyl (meth)acrylate, and n-butyl (meth)acrylate, and known aromatic vinyl compounds such as styrene and α-methylstyrene.

Examples of commercially available products of the methacrylic resin include ACRYPET (registered trademark) VH, ACRYPET MD, and ACRYPET MF (all trade names, manufactured by Mitsubishi Chemical Corporation).

[Light Absorbing Agent (L)]

The molded product (1) of the present invention can contain a light absorbing agent (L) as one of the constituent components. Further, the molded product (2) of the present invention contains a light absorbing agent (L) as one of the constituent components of the thermoplastic resin composition.

The light absorbing agent (L) includes two or more kinds of light absorbing agents having different wavelengths at which the maximum value of the absorbance is shown in a wavelength range of 380 nm or more and 730 nm or less. The total light transmittance of the molded product can be efficiently decreased by allowing the light absorbing agent (L) to include two or more kinds of light absorbing agents. Therefore, a molded product having more excellent jet blackness can be obtained.

The molded product (1) of the present invention may contain a light absorbing agent (B) having a wavelength at which the maximum value of the absorbance is shown in a wavelength range of 630 nm or more and 700 nm or less, as the light absorbing agent (L). In the molded product (2) of the present invention, the light absorbing agent (L) includes a light absorbing agent (B). Since the light absorbing agent (L) includes the light absorbing agent (B), the obtained molded product can selectively transmit light having a specific wavelength in a case where the light source is turned on so that a specific color tone can be exhibited, and the molded product has excellent selectivity of the color of the transmitted light.

It is preferable that the molded product does not contain a light absorbing agent having a wavelength at which the maximum value of the absorbance is shown in a wavelength range of more than 720 nm, as the light absorbing agent (L). In a case where the molded product does not contain a light absorbing agent having a wavelength at which the maximum value of the absorbance is shown in a wavelength range of more than 720 nm, the solar transmittance of the obtained molded product can be more efficiently increased. Therefore, the molded product is unlikely to store heat and is unlikely to be deformed or deteriorated due to heat or thermally cracked.

The above-described effects can be more efficiently obtained by allowing the molded product to contain the light absorbing agent (B) as the light absorbing agent (L).

The molded product may contain a light absorbing agent (A) as the light absorbing agent (L) in the present invention. The total light transmittance of the molded product can be efficiently decreased by allowing the molded product to further contain the light absorbing agent (A) in addition to the light absorbing agent (B) as the light absorbing agent (L). Therefore, a molded product having more excellent jet blackness can be obtained.

In the present invention, the absorbance is measured using a spectrophotometer.

(Light Absorbing Agent (A))

The light absorbing agent (A) is a light absorbing agent having a wavelength at which the maximum value of the absorbance is in a wavelength range of 400 nm or more and less than 630 nm.

The obtained molded product selectively transmits light having a specific wavelength more efficiently in a case where the light source is turned on in combination with the effects exhibited by the light absorbing agent (B) so that a specific color tone can be exhibited by allowing the molded product to contain the light absorbing agent (A) as the light absorbing agent (L).

Examples of the light absorbing agent (A) include a near-infrared absorbing coloring agent. Examples of the near-infrared absorbing coloring agent include an anthraquinone-based coloring agent and a phthalocyanine-based coloring agent. Among the examples of the light absorbing agent (A), an anthraquinone-based coloring agent serving as a near-infrared absorbing coloring agent is preferable from the viewpoint that the transparency and the weather resistance of the molded product are excellent.

The light absorbing agent (A) may be used alone or in combination of two or more kinds thereof.

Examples of the light absorbing agent (A) include SDO Series (manufactured by Arimoto Chemical Co., Ltd.), EXCOLOR (registered trademark) Series (manufactured by Nippon Shokubai Co., Ltd.), and KAYASORB (registered trademark) Series (manufactured by Nippon Kayaku Co., Ltd.).

In a case where the molded product contains the light absorbing agent (A), the content thereof (in a case where the molded product contains two or more kinds of light absorbing agents (A) in combination, the total amount thereof) can be set to 0.001 parts by mass or more and 1 part by mass or less and preferably 0.01 parts by mass or more and 0.5 parts by mass or less with respect to 100 parts by mass of the transparent resin in the molded product (1) of the present invention or with respect to 100 parts by mass of the methacrylic resin in the molded product (2) of the present invention. In a case where the content of the light absorbing agent (A) is more than or equal to the above-described lower limit, the molded product has excellent selectivity of the color of the transmitted light. In a case where the content thereof is less than or equal to the above-described upper limit, the molded product has excellent intensity of transmitted light.

(Light Absorbing Agent (B))

The light absorbing agent (B) is a light absorbing agent having a wavelength at which the maximum value of the absorbance is shown in a wavelength range of 630 nm or more and 700 nm or less.

The obtained molded product has excellent selectivity of the color of transmitted light by containing the light absorbing agent (B) as the light absorbing agent (L).

Examples of the light absorbing agent (B) include dyes. Examples of the dyes include an anthraquinone-based dye, a perinone-based dye, a methine-based dye, and a quinophthalone-based dye. Among the examples of the light absorbing agent (B), an anthraquinone-based dye and a perinone-based dye, which are dyes, are preferable from the viewpoint that the molded product has excellent weather resistance.

The light absorbing agent (B) may be used alone or in combination of two or more kinds thereof.

Examples of the anthraquinone-based dye include dyes with Color Index such as Solvent Blue 87, Solvent Blue 94, Solvent Blue 97, Solvent Green 3, Solvent Green 28, Solvent Red 52, Solvent Red 111, Disperse Red 22, Solvent Violet 13, and Solvent Violet 36.

Examples of the perinone-based dye include dyes with Color Index such as Solvent Orange 60, Solvent Red 135, and Solvent Red 179.

Examples of the methine-based dye include dyes with Color Index such as Solvent Orange 107 and Solvent Yellow 179.

Examples of the quinophthalone-based dye include dyes with Color Index such as Solvent Yellow 33, Disperse Yellow 54, and Disperse Yellow 160.

The thermoplastic resin composition according to the molded product (2) of the present invention contains a methacrylic resin and at least one light absorbing agent (B) as the light absorbing agent (L). The content thereof (in a case where the molded product contains two or more kinds of light absorbing agents (B) in combination, the total amount thereof) can be set to 0.1 parts by mass or more and 0.5 parts by mass or less and preferably 0.15 parts by mass or more and 0.35 parts by mass or less with respect to 100 parts by mass of the methacrylic resin. In a case where the content of the light absorbing agent (B) is more than or equal to the above-described lower limit, the molded product has excellent selectivity of the color of the transmitted light. In a case where the content thereof is less than or equal to the above-described upper limit, the molded product has excellent intensity of transmitted light.

The light absorbing agent (L) in the present invention includes two or more kinds of light absorbing agents having different wavelengths at which the maximum value of the absorbance is shown in a wavelength range of 380 nm or more and 730 nm or less.

n, which is the number of kinds of the light absorbing agents (L), represents an integer of 2 or more. n represents preferably an integer of 2 or more and 20 or less, more preferably an integer of 2 or more and 10 or less, still more preferably an integer of 2 or more and 5 or less, and particularly preferably an integer of 3 or more and 4 or less from the viewpoint of excellent selectivity of the wavelength of the transmitted light.

As one embodiment of the light absorbing agent (L) in the present invention, the light absorbing agents (L) may include one kind of light absorbing agent (A) and one or more kinds of light absorbing agents (B). As another embodiment of the light absorbing agent (L) in the present invention, the light absorbing agents (L) may include one or more kinds of light absorbing agents (B) without including the light absorbing agent (A).

It is preferable that the light absorbing agent (L) in the present invention satisfies any of the following condition 1 or 2. The obtained molded product can exhibit an excellent jet black color in a case where the light source is turned off and can exhibit a specific color tone in a case where the light source is turned on, by satisfying any of the following condition 1 or 2.

Condition 1:

only one i that satisfies Expression (5) is present, and Expression (6) is satisfied.

Expression (5):

$$\lambda(i+1)-\lambda(i) \geq 160 \text{ nm} \quad (5)$$

Expression (6):

$$\lambda(1)-380 \text{ nm} < 160 \text{ nm} \quad (6)$$

Condition 2:

Expression (5) is not satisfied, and Expression (7) is satisfied.

Expression (5):

$$\lambda(i+1)-\lambda(i) \geq 160 \text{ nm} \quad (5)$$

Expression (7):

$$\lambda(1)-380 \text{ nm} \geq 160 \text{ nm} \quad (7)$$

Further, λ(i) is a wavelength of one light absorbing agent (i) among the light absorbing agents (L), at which the maximum value of the absorbance is shown in a wavelength range of 380 nm or more and 730 nm or less, i represents an integer of 1 to n, n represents an integer of 2 or more and denotes the number of kinds of the light absorbing agents (L) contained in the molded product or the thermoplastic resin composition, λ(n+1) is 730 nm, and an expression of λ(1) <λ(2)< . . . <λ(n)<λ(n+1) is satisfied.

For example, since the molded product of Example 1 described below contains a light absorbing agent (B1) having a wavelength at which the maximum value of the absorbance is shown at 690 nm and a light absorbing agent (A1) having a wavelength at which the maximum value of the absorbance is shown at 450 nm, n represents 2, λ(1) is 450 nm, λ(2) is 690 nm, and λ(3) is 730 nm.

In a case where the description above is applied to Expression (5), only λ(2)−(1) satisfies Expression (5) and also satisfies Expression (6).

Figure 2:
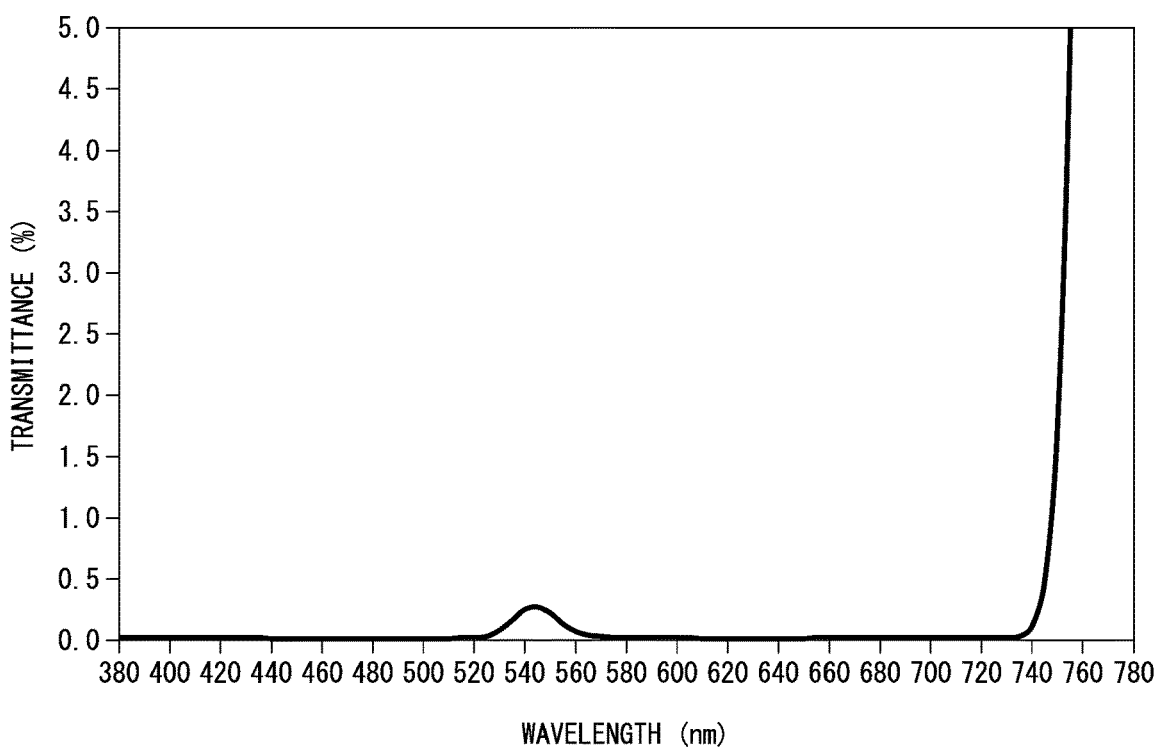
FIG. 2 is a graph showing a light transmittance of a molded product of Example 1 in a wavelength range of 380 nm or more and 780 nm or less.

As a result, only light having a wavelength between λ(1) and λ(2), that is, between 450 nm and 690 nm, is selectively transmitted as shown in FIG. 2.

Further, for example, since the molded product of Example 2 described below contains a light absorbing agent (B1) having a wavelength at which the maximum value of the absorbance is shown at 690 nm and a light absorbing agent (A2) having a wavelength at which the maximum value of the absorbance is shown at 590 nm, n represents 2, λ(1) is 590 nm, λ(2) is 690 nm, and λ(3) is 730 nm.

In a case where the description above is applied to Expression (5), the light absorbing agent (i) satisfying Expression (5) is not present, and Expression (7) is satisfied.

Figure 3:
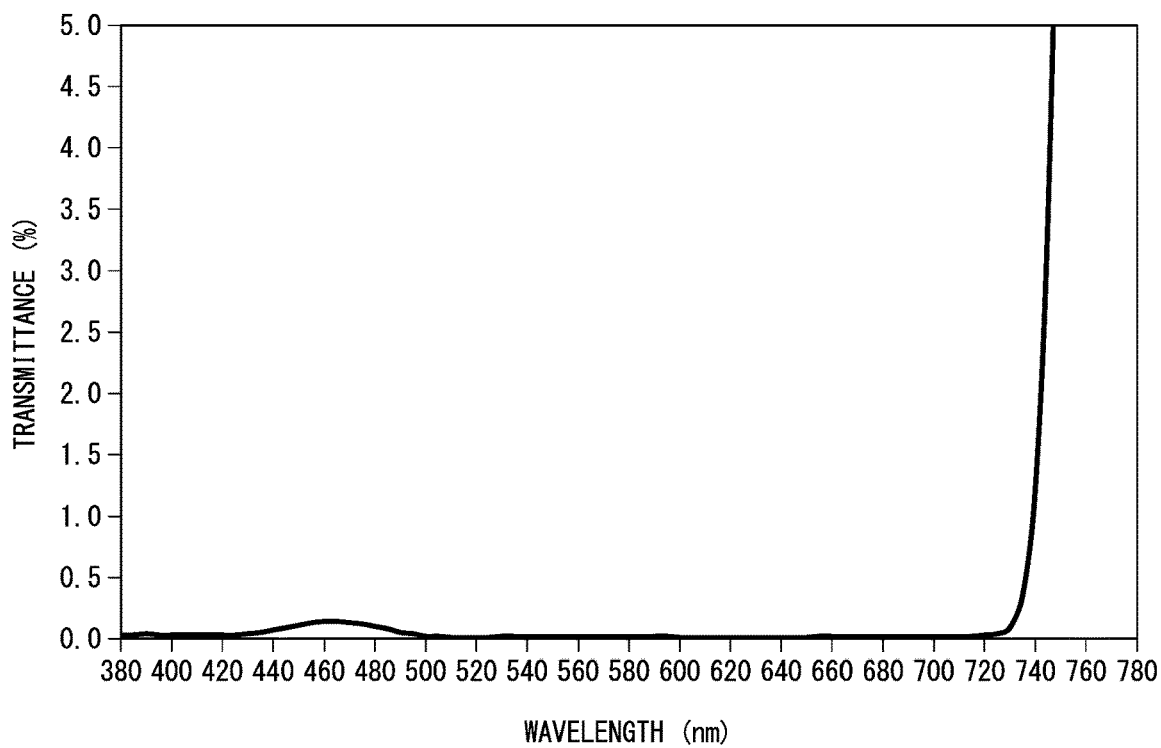
FIG. 3 is a graph showing a light transmittance of a molded product of Example 2 in a wavelength range of 380 nm or more and 780 nm or less.

As a result, only light having a wavelength between 380 nm and λ(1), that is, between 380 nm and 590 nm, is selectively transmitted as shown in FIG. 3.

Further, for example, since the molded product of Example 3 described below contains a light absorbing agent (B1) having a wavelength at which the maximum value of the absorbance is shown at 690 nm and a light absorbing agent (A3) having a wavelength at which the maximum value of the absorbance is shown at 480 nm, n represents 2, λ(1) is 480 nm, λ(2) is 690 nm, and λ(3) is 730 nm.

In a case where the description above is applied to Expression (5), only λ(2)−(1) satisfies Expression (5) and also satisfies Expression (6).

Figure 4:
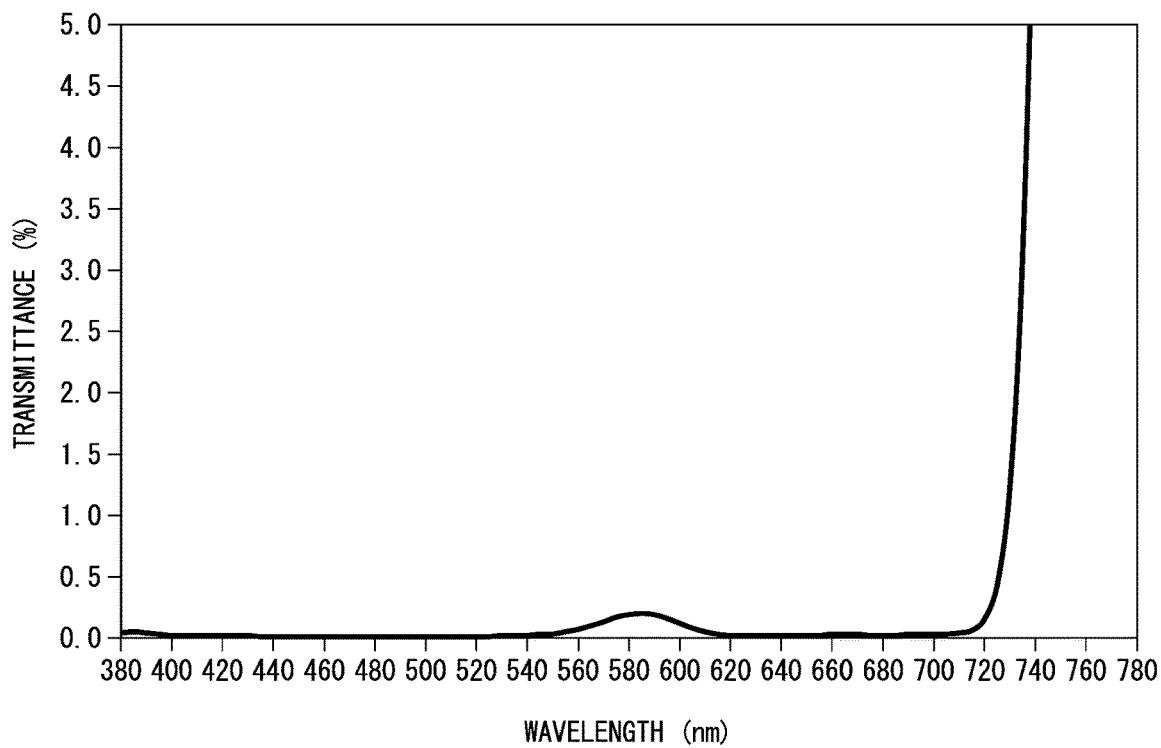
FIG. 4 is a graph showing a light transmittance of a molded product of Example 3 in a wavelength range of 380 nm or more and 780 nm or less.

As a result, only light having a wavelength between λ(1) and λ(2), that is, between 480 nm and 690 nm, is selectively transmitted as shown in FIG. 4.

Further, for example, since the molded product of Example 4 described below contains a light absorbing agent (B1) having a wavelength at which the maximum value of the absorbance is shown at 690 nm, a light absorbing agent (A4) having a wavelength at which the maximum value of the absorbance is shown at 510 nm, and a light absorbing agent (A3) having a wavelength at which the maximum value of the absorbance is shown at 480 nm, n represents 3, λ(1) is 480 nm, λ(2) is 510 nm, λ(3) is 690 nm, and λ(4) is 730 nm.

In a case where the description above is applied to Expression (5), only λ(3)−(2) satisfies Expression (5) and also satisfies Expression (6).

Figure 5:
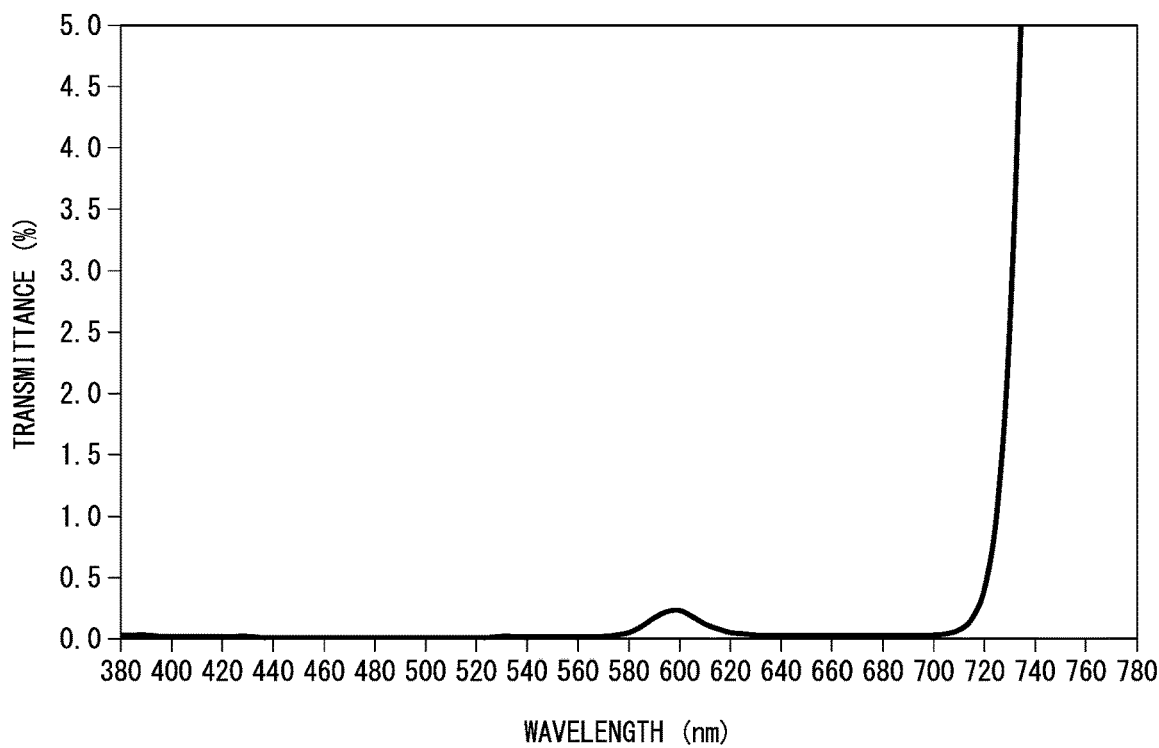
FIG. 5 is a graph showing a light transmittance of a molded product of Example 4 in a wavelength range of 380 nm or more and 780 nm or less.

As a result, only light having a wavelength between λ(2) and λ(3), that is, between 510 nm and 690 nm, is selectively transmitted as shown in FIG. 5.

As described above, in the molded product of the present invention, in a case where wavelengths at which the maximum values of the absorbances of two or more kinds of light absorbing agents having different wavelengths at which the maximum values of the absorbances are shown in a wavelength range of 380 nm or more and 730 nm or less are arranged in an ascending order, a difference between adjacent wavelengths of any of the above-described wavelengths or only one of λ(1)−380 nm or 730 nm−λ(n) is 160 nm or more in a wavelength range of 380 nm to 730 nm. Therefore, since the molded product of the present invention can selectively transmit only light having a wavelength between values in the above-described ranges, emitted light from a light source (LED) having a specific emission wavelength or white light emitted from a white light source is allowed to be transmitted through the molded product, and thus the light transmitted through the molded product can be converted into colored light, that is, the light having a specific wavelength is selectively transmitted so that a specific color tone can be exhibited.

According to one embodiment, the light absorbing agent (L) in the present invention satisfies the condition 1. In the present embodiment, since only one i satisfying λ(i+1)−λ(i)≥160 nm (Expression (5)) is present, a molded product capable of selectively transmitting light having a wavelength between λ(i) and λ(i+1) can be obtained.

According to another embodiment, the light absorbing agent (L) in the present invention satisfies the condition 2. In the present embodiment, since i satisfying λ(i+1)−λ(i) ≥160 nm (Expression (5)) is not present and λ(1)−380 nm is 160 nm or more (Expression (7)), a molded product capable of transmitting light having a wavelength between 380 nm and λ(1) can be obtained.

According to still another embodiment, the light absorbing agent (L) does not include the light absorbing agent (A), and i that satisfies the condition 1 and satisfies Expression (5) is only n. That is, Expression (5') "λ(n+1)−λ(n)≥160 nm . . . (5')" is satisfied, and i other than n does not satisfy Expression (5) and satisfies Expression (6). According to the present embodiment, since λ(n+1)−λ(n) is 160 nm or more, a molded product capable of selectively transmitting light having a wavelength between A (n) and 730 nm can be obtained.

In a case where the molded product of the present invention is obtained, it is necessary to decrease the total light transmittance of the molded product or the thermoplastic resin composition in order to obtain the molded product having excellent jet blackness. In the molded product of the present invention, the total light transmittance of the molded product can be decreased by using two or more kinds of light absorbing agents (L) having different wavelengths at which the maximum value of the absorbance is shown in a wavelength range of 380 nm or more and 730 nm or less.

Light having a specific wavelength can be selectively transmitted while the total light transmittance is decreased by using a combination of two or more kinds of light absorbing agents (L) so that a specific color tone can be exhibited. Specifically, purple to blue can be displayed in a case where light having a wavelength of 380 nm to 495 nm is transmitted, green can be displayed in a case where light having a wavelength of 495 nm to 570 nm is transmitted, yellow to orange can be displayed in a case where light having a wavelength of 570 nm to 620 nm is transmitted, and red can be displayed in a case where light having a wavelength of 620 nm to 700 nm is transmitted.

In order to selectively transmit light having a specific wavelength, the combination of the light absorbing agents (L) is required to be adjusted. As described above, the combination of the light absorbing agents may be adjusted such that in a case where wavelengths of the light absorbing agents (L) at which the maximum values of the absorbances of two or more kinds of light absorbing agents having different wavelengths at which the maximum values of the absorbances are shown in a wavelength range of 380 nm or more and 730 nm or less are arranged in an ascending order, a difference between adjacent wavelengths of any of the above-described wavelengths or only one of $\lambda(1)$–380 nm or 730 nm–$\lambda(n)$ is 160 nm or more in a wavelength range of 380 nm to 730 nm.

Further, in the light absorbing agent (B), the maximum value of the absorbance in a wavelength range of 380 nm or more and 730 nm or less is in a wavelength range of 630 nm or more and 700 nm or less, and thus light having a wavelength in a wavelength region of 730 nm or more is transmitted. Therefore, the solar transmittance of the molded product is not impaired. Further, the solar transmittance of the molded product of the present invention can be sufficiently increased by setting the light transmittance at a wavelength of 770 nm to 0.5% or more and 5% or more.

Therefore, in a wavelength range of 430 nm or more and 700 nm or less, a molded product having a wavelength at which the maximum value of the light transmittance is shown in a wavelength range of 430 nm or more and less than 680 nm can be obtained by using the light absorbing agent (L) that satisfies the condition 2 or the light absorbing agent (L) that includes at least one light absorbing agent (A) and satisfies the condition 1.

Further, in a wavelength range of 430 nm or more and 700 nm or less, a molded product having a wavelength at which the maximum value of the light transmittance is shown in a wavelength range of 430 nm or more and less than 680 nm can be obtained by allowing the molded product not to contain the light absorbing agent (A) and by using the light absorbing agent (L) that satisfies the condition 1 and satisfies Expression (5') in which i satisfying Expression (5) is n, that is, i other than n does not satisfy Expression (5).

[Method of Producing Thermoplastic Resin Composition]

The thermoplastic resin composition in the molded product (2) of the present invention can be produced by mixing a methacrylic resin and two or more kinds of light absorbing agents (L). A known method can be employed as the mixing method and, for example, the methacrylic resin and the light absorbing agents are mixed using a mixer such as a Henschel mixer, a ribbon blender, a Banbury mixer, or a drum tumbler and kneaded typically at a melting temperature of 200° C. to 300° C. for 5 to 60 minutes using a kneader such as a single screw extruder, a twin screw extruder, or a multi-screw extruder, thereby producing the thermoplastic resin composition of the present invention.

The molded product or the thermoplastic resin composition of the present invention may contain other additives within a range where the original performance is not impaired. Examples of other additives include impact resistance modifiers, ultraviolet absorbing agents, light stabilizers, antioxidants, and release agents.

The other additives may be used alone or in combination of two or more kinds thereof.

<Display Device>

The display device of the present invention may employ known aspects except for including the molded product of the present invention. FIG. 1 is a schematic view showing an example of the display device of the present invention.

A display device 1 of the present invention includes a light source 10 and a molded product 12 of the present invention which is disposed such that light 20 emitted from the light source is transmitted. Since the molded product of the present invention has excellent jet blackness and can selectively transmit light having a specific wavelength so that a specific color tone is exhibited, light 22 emitted from a light source and transmitted through the molded product 12 is converted into colored light having a specific color tone in response to the light transmittance of the molded product 12 of the present invention even in a case where a white light source is used as the light source 10, and thus display by colored light can be carried out.

Examples of the white light source include incandescent lamps, fluorescent lamps, LED lamps, and HID lamps.

The white light source may be used alone or in combination of two or more kinds thereof.

The light source 10 used in the display device 1 of the present invention may be a light source other than the white light source.

For example, in a case where red light is intended to be transmitted, a display device with an excellent intensity of red transmitted light can be obtained by combining a known red light emitting diode (red LED) and the molded product of the present invention which transmits red light.

In a case where blue light is intended to be transmitted, a display device with an excellent intensity of blue transmitted light can be obtained by combining a known blue light emitting diode (blue LED) and the molded product of the present invention which transmits blue light.

In a case where yellow light or orange light is intended to be transmitted, a display device with an excellent intensity of yellow or orange transmitted light can be obtained by combining a known white light source and the molded product of the present invention which transmits yellow light or orange light.

The distance between the light source 10 and the molded product 12 is not particularly limited and may be adjusted such that the hue of the light 22 emitted from the light source and transmitted through the molded product 12 can be visually confirmed, but is preferably 0.1 cm or more and 100 cm or less and more preferably 0.1 cm or more and 30 cm or less because it is not necessary to extremely increase the intensity of the light from the light source.

EXAMPLES

Hereinafter, the present invention will be described in detail with reference to examples, but the present invention is not limited to such examples.

(Material Used for Production of Thermoplastic Resin Composition)

Thermoplastic resin: methacrylic resin (trade name, "ACRYPET (registered trademark) VH", manufactured by Mitsubishi Chemical Corporation)

Light absorbing agent (A): light absorbing agent (A1): dye with Color Index of Solvent Orange 60, wavelength at which maximum value of absorbance is shown at 450 nm)

light absorbing agent (A2): dye with Color Index of Solvent Violet 13, wavelength at which maximum value of absorbance is shown at 590 nm)

light absorbing agent (A3): dye with Color Index of Solvent Red 179, wavelength at which maximum value of absorbance is shown at 480 nm)

light absorbing agent (A4): dye with Color Index of Solvent Red 168, wavelength at which maximum value of absorbance is shown at 510 nm)

light absorbing agent (A5): dye with Color Index of Solvent Blue 94, wavelength at which maximum value of absorbance is shown at 620 nm)

Light absorbing agent (B): light absorbing agent (B1): dye with Color Index of Solvent Green 28, wavelength at which maximum value of absorbance is shown at 690 nm Other light absorbing agents (C): light absorbing agent (C1): anthraquinone-based coloring agent (trade name "SDO-11", manufactured by Arimoto Chemical Co., Ltd., wavelength at which maximum value of absorbance is shown at 755 nm)

(Measurement of Transmittance)

The light transmittance of the molded product in a wavelength range of 380 nm or more and 780 nm or less was measured by allowing light having a wavelength of 380 nm or more and 780 nm or less to be transmitted from the rear surface of the molded product and allowing the light to be transmitted from the front surface of the molded product using a spectrophotometer (model name, "U4100" manufactured by Hitachi High-Tech Corporation).

(Measurement of L* Value)

The L* value of reflected light of the molded product was calculated from the tristimulus values X, Y, and Z measured by reflection measurement under a viewing angle condition of 2° using a spectrophotometer (model name, "U4100" manufactured by Hitachi High-Tech Corporation) and a C light source in conformity with ISO 11664-4. Further, the reflection measurement was carried out by integrating a specular reflection component and a diffuse reflection component and receiving light using an integrated sphere.

(Measurement of Total Light Transmittance)

The total light transmittance of the molded product was measured using a transmittance meter (model name, "HM-100", manufactured by Murakami Color Research Laboratory) in conformity with ISO 13468-1.

In addition, "0%" listed in Table 2 is a low value beyond the detection limit and is at least 0.1% or less from the reading accuracy of the transmittance meter.

(5) Solar Transmittance

As an index of the heat ray shielding property, the solar transmittance was measured by the following procedure in conformity with JIS R 3106. The spectral transmittance (unit: %) of a test piece (length of 50 mm×width of 50 mm, thickness of 3 mm) of a resin molded product at a wavelength of 300 to 2100 nm was measured using an ultraviolet visible near-infrared spectrophotometer (manufactured by Hitachi High-Tech Corporation, model name: UH4150), and the solar transmittance thereof was calculated in conformity with JIS R 3106.

(Measurement of Color of Transmitted Light)

With the molded product, white light (LED lamp, trade name, "MAGLITE ST2D") was transmitted from the rear surface of the molded product, and the color of the light transmitted from the front surface of the molded product was visually confirmed.

Example 1

100 parts by mass of the thermoplastic resin, 0.18 parts by mass of the light absorbing agent (A1), and 0.18 parts by mass of the light absorbing agent (B1) were mixed using a Henschel mixer (model name, "SMV-20", manufactured by Kawata MFG. Co., Ltd.) and kneaded at a melting temperature of 250° C. using a twin screw extruder (model name, "PCM45", manufactured by Ikegai Corp.), thereby obtaining pellets of a thermoplastic resin composition.

The pellets of the obtained thermoplastic resin composition were injection-molded at a cylinder temperature of 250° C. and a metal mold temperature of 60° C. using an injection molding machine (model name, "SAV-60", manufactured by Sanjo Seiki Co., Ltd.), thereby obtaining a flat plate-like molded product (size: 100 mm×50 mm, thickness of 2 mm).

The evaluation results of the obtained molded product are listed in Table 2.

Further, the light transmittance of the obtained molded product at a wavelength of 380 nm or more and 780 nm or less is shown in FIG. 2.

Examples 2 to 5 and Comparative Examples 1 to 3

A molded product was obtained in the same manner as in Example 1 except that the light absorbing agent used was changed as listed in Table 1. Further, the numbers in the tables denote the content (parts by mass).

The evaluation results of the obtained molded product are listed in Table 2.

Further, the light transmittances of the molded products obtained in Examples 2 to 5 and Comparative Examples 1 to 3 in a wavelength range of 380 nm or more and 780 nm or less are shown in FIGS. 3 to 9.

TABLE 1

| | Thermoplastic resin | Light absorbing agent $\lambda$ (i) (nm) | | | | | | |
| --- | --- | --- | --- | --- | --- | --- | --- | --- |
| | | (A1) 450 | (A2) 590 | (A3) 480 | (A4) 510 | (A5) 620 | (B1) 690 | (C1) 755 |
| Example 1 | 100 | 0.18 | | | | | 0.18 | |
| Example 2 | 100 | | 0.10 | | | | 0.10 | |
| Example 3 | 100 | | | 0.14 | | | 0.06 | |
| Example 4 | 100 | | | 0.15 | 0.20 | | 0.05 | |
| Example 5 | 100 | 0.01 | | | | | 0.35 | |
| Comparative Example 1 | 100 | 0.12 | | | | | 0.02 | 0.03 |
| Comparative Example 2 | 100 | | 0.14 | | | 0.18 | | 0.03 |
| Comparative Example 3 | 100 | | | 0.20 | | | 0.10 | 0.03 |

TABLE 2

| | n | (nm) | 380 nm | λ (1) | λ (2) | λ (3) | λ (4) | λ (n) < λ (n + 1) = 730 nm | Expression (5) λ (i + 1) − λ (i) ≥ 160 nm | Expression (6) λ (1) − 380 nm < 160 nm | Expression (7) λ (1) − 380 nm ≥ 160 nm |
|---|---|---|---|---|---|---|---|---|---|---|---|
| Example 1 | 2 | Wavelength | (380) | 450 | 690 | (730) | — | Satisfied | Only one is satisfied | Satisfied | Not satisfied |
| | | λ (i + 1) − λ (i) | | 70 | 240 | 30 | | | | | |
| Example 2 | 2 | Wavelength | (380) | 590 | 690 | (730) | — | Satisfied | Not satisfied | Not satisfied | Satisfied |
| | | λ (i + 1) − λ (i) | | 210 | 100 | 30 | | | | | |
| Example 3 | 2 | Wavelength | (380) | 480 | 690 | (730) | — | Satisfied | Only one is satisfied | Satisfied | Not satisfied |
| | | λ (i + 1) − λ (i) | | 100 | 210 | 30 | | | | | |
| Example 4 | 3 | Wavelength | (380) | 480 | 510 | 690 | (730) | Satisfied | Only one is satisfied | Satisfied | Not satisfied |
| | | λ (i + 1) − λ (i) | | 100 | 30 | 180 | 30 | | | | |
| Example 5 | 2 | Wavelength | (380) | 450 | 690 | (730) | — | Satisfied | Only one is satisfied | Satisfied | Not satisfied |
| | | λ (i + 1) − λ (i) | | 70 | 240 | 30 | | | | | |
| Comparative Example 1 | 3 | Wavelength | (380) | 450 | 690 | 755 | (730) | Not satisfied | Only one is satisfied | Satisfied | Not satisfied |
| | | λ (i + 1) − λ (i) | | 70 | 240 | 65 | −35 | | | | |
| Comparative Example 2 | 3 | Wavelength | (380) | 590 | 620 | 755 | (730) | Not satisfied | Not satisfied | Not satisfied | Satisfied |
| | | λ (i + 1) − λ (i) | | 210 | 30 | 135 | −35 | | | | |
| Comparative Example 3 | 3 | Wavelength | (380) | 480 | 690 | 755 | (730) | Not satisfied | Not satisfied | Satisfied | Not satisfied |
| | | λ (i + 1) − λ (i) | | 100 | 110 | 65 | −35 | | | | |

TABLE 3

| | L* value | Total light transmittance (%) | Wavelength at which maximum value of transmittance is shown (nm) | Maximum value of light transmittance | Light transmittance at wavelength of 770 nm | Solar transmittance (%) | Color of transmitted light | Color of appearance |
|---|---|---|---|---|---|---|---|---|
| Example 1 | 26 | 0.07 | 545 | 0.27 | 30 | 40.7 | Green | Jet black color |
| Example 2 | 27 | 0.02 | 460 | 0.14 | 50 | 41.5 | Bluer | Jet black color |
| Example 3 | 26 | 0.07 | 585 | 0.20 | 65 | 42.3 | Yellow | Jet black color |
| Example 4 | 26 | 0.05 | 600 | 0.23 | 70 | 42.6 | Orange | Jet black color |
| Example 5 | 26 | 0.02 | 510 | 0.13 | 10 | 38.0 | Green | Jet black color |
| Comparative Example 1 | 26 | 0.04 | 540 | 0.10 | <0.1 | 35.5 | Green | Jet black color |
| Comparative Example 2 | 27 | 0.05 | 435 | 1.40 | <0.1 | 35.5 | Blue | Jet black color |
| Comparative Example 3 | 26 | 0.01 | 590 | 0.20 | <0.1 | 35.5 | Orange | Jet black color |

The molded products obtained in Examples 1 to 5 had a high solar transmittance, had excellent jet blackness in a case where the light source was turned off, and were able to selectively transmit light having a specific wavelength in a case where the light source was turned on as shown in FIGS. 2 to 5 and 9 so that a specific color tone was exhibited.

Figure 6:
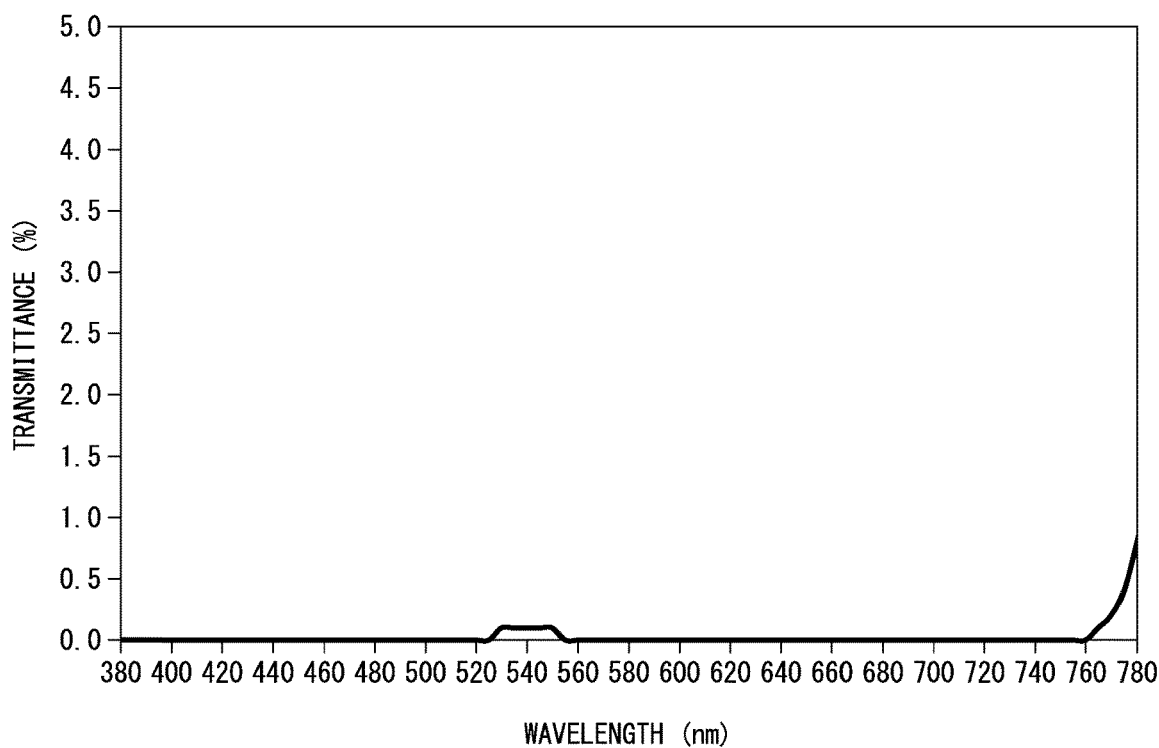
FIG. 6 is a graph showing a light transmittance of a molded product of Comparative Example 1 in a wavelength range of 380 nm or more and 780 nm or less.
Figure 7:
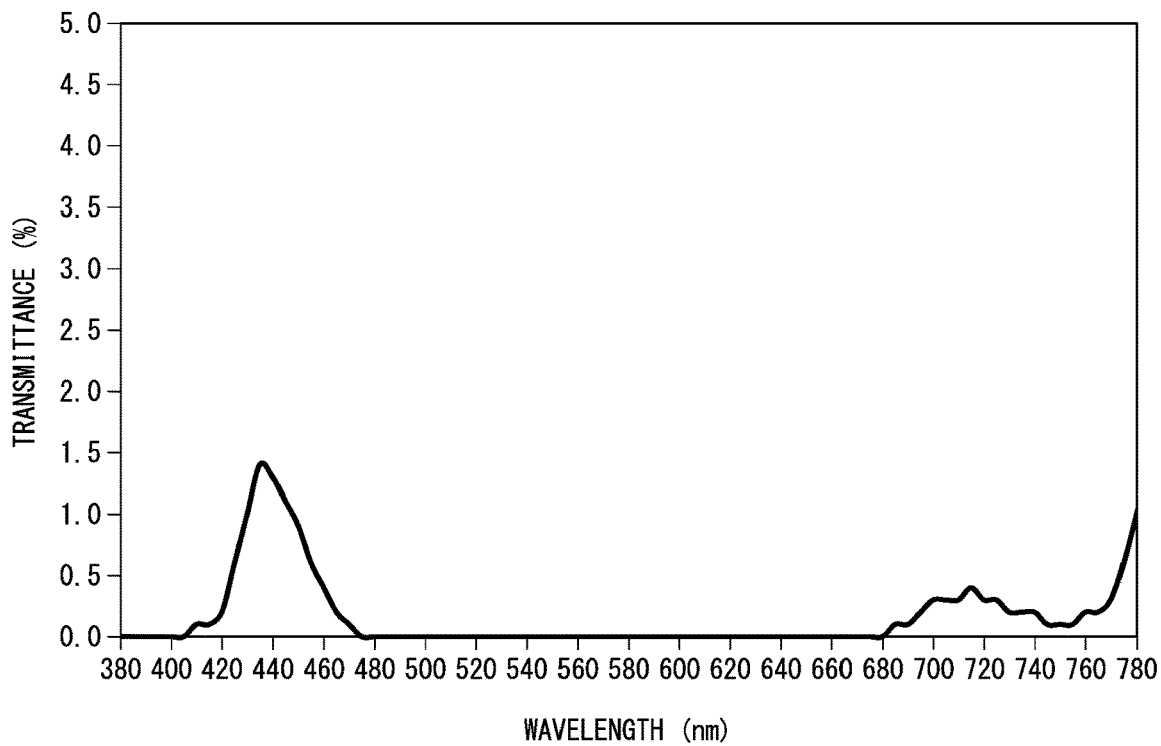
FIG. 7 is a graph showing a light transmittance of a molded product of Comparative Example 2 in a wavelength range of 380 nm or more and 780 nm or less.
Figure 8:
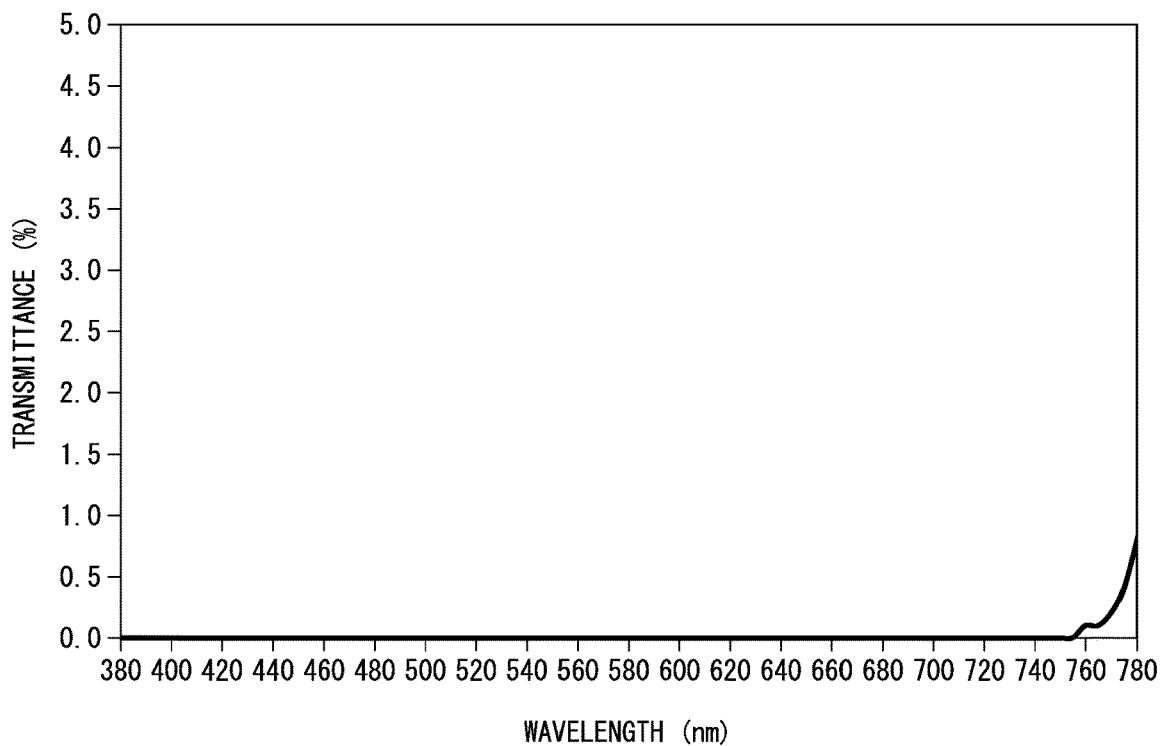
FIG. 8 is a graph showing a light transmittance of a molded product of Comparative Example 3 in a wavelength range of 380 nm or more and 780 nm or less.
Figure 9:
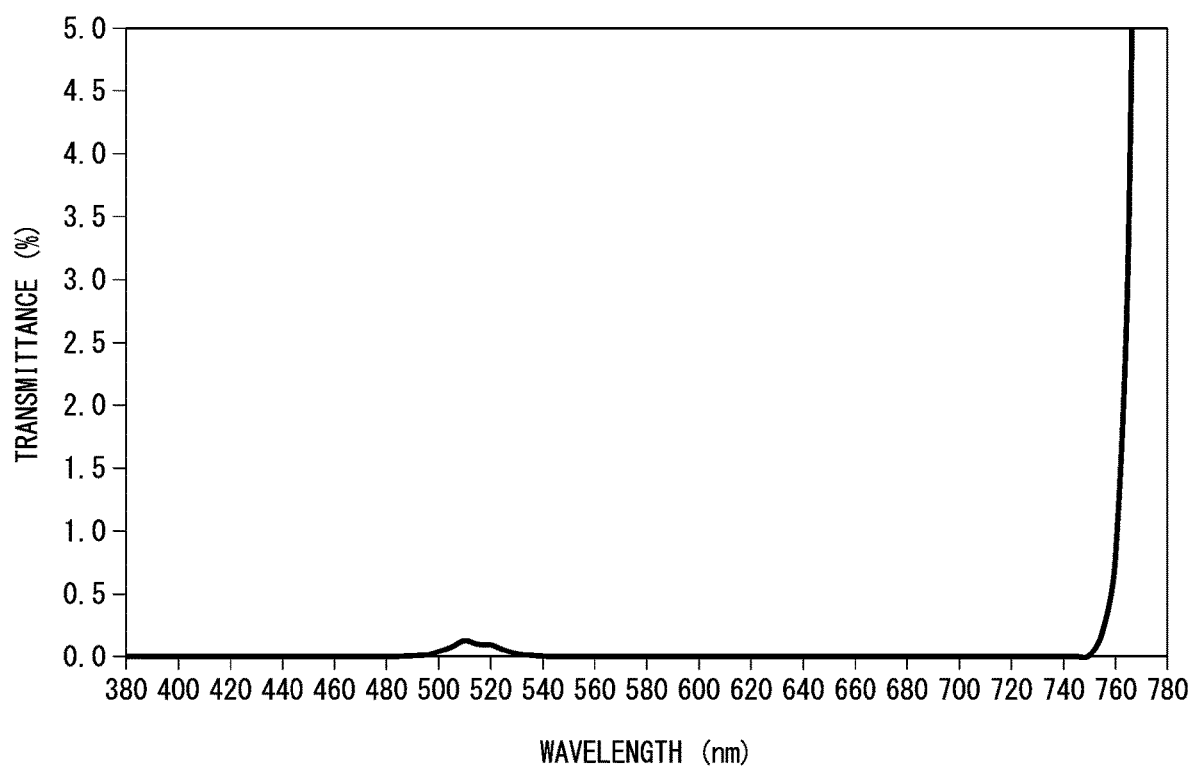
FIG. 9 is a graph showing a light transmittance of a molded product of Example 5 in a wavelength range of 380 nm or more and 780 nm or less.

The molded products obtained in Comparative Examples 1 to 3 had excellent jet blackness and were able to selectively transmit light having a specific wavelength as shown in FIGS. 6 to 8 so that a specific color tone was exhibited, but the solar transmittance was low.

INDUSTRIAL APPLICABILITY

The molded product of the present invention has excellent jet blackness in a case where the light source is turned off and can selectively transmit light having a specific wavelength in a case where the light source is turned on so that a specific color tone is exhibited. Further, the solar transmittance is high. Therefore, the molded product is unlikely to store heat and is unlikely to be deformed or deteriorated due to heat or thermally cracked. Therefore, the molded product of the present invention can be suitably used for display devices that display characters, numbers, signals, and the like; vehicle exterior parts such as pillars, garnishes, front grilles, bumpers, molding parts; and external members that require a high-class appearance. In particular, the molded product can be suitably used for display devices.

REFERENCE SIGNS LIST

1: Display device
10: Light source
12: Molded product
20: Light emitted from light source
22: Light emitted from light source and transmitted through molded product

The invention claimed is:
1. A molded product comprising:
a transparent resin; and
two or more light absorbing agents (L),
wherein an L* value of reflected light is 35 or less,
in a wavelength range of 430 nm or more and 700 nm or less, a wavelength at which a maximum value of a light transmittance is shown is in a wavelength range of 430 nm or more and less than 680 nm,
a light transmittance at a wavelength of 770 nm is 0.5% or more, and
wherein each of the two or more light absorbing agents (L) have a maximum value of an absorbance at a respective wavelength in a range of 380 nm to 730 nm, and a combination of absorbance wavelengths of the two or more light absorbing agents (L) satisfies either (i) only one adjacent pair of the absorbance wavelengths is separated by 160 nm or more and a shortest wavelength is less than 540 nm, or (ii) no adjacent pair of the absorbance wavelengths is separated by 160 nm or more, and the shortest wavelength is spaced from 380 nm by at least 160 nm.

2. The molded product according to claim 1,
wherein the molded product comprises a light absorbing agent (B) having a wavelength at which the maximum value of the absorbance is shown in a wavelength range of 630 nm or more and 700 nm or less, as the light absorbing agent (L).

3. The molded product according to claim 2,
wherein the molded product does not comprise a light absorbing agent having a wavelength at which the maximum value of the absorbance is shown in a wavelength range of more than 720 nm, as the light absorbing agent (L).

4. The molded product according to claim 1,
wherein a total light transmittance of the molded product is less than 5%.

5. The molded product according to claim 1,
wherein in a wavelength range of 430 nm or more and 700 nm or less, the maximum value of the light transmittance at a wavelength at which the maximum value of the light transmittance is shown is 0.1% or more.

6. The molded product according to claim 1,
wherein the light transmittance at a wavelength of 770 nm is 1% or more.

7. The molded product according to claim 1,
wherein the transparent resin is a methacrylic resin.

8. The molded product according to claim 1, wherein the light absorbing agent (L) satisfies any of the following conditions 1 and 2, Condition 1: only one i that satisfies Expression (5) is present, and Expression (6) is satisfied, Expression (5): $\lambda(i+1)-\lambda(i) \geq 160$ nm (5)
Expression (6): $\lambda(1)-380$ nm $< 160$ nm (6)
Condition 2: Expression (5) is not satisfied, and Expression (7) is satisfied, Expression (5): $\lambda(i+1)-\lambda(i) \geq 160$ nm (5)

Expression (7): $\lambda(1)-380$ nm $\geq 160$ nm (7)
in the expression, (i) represents a wavelength of a light absorbing agent (i), which is one of the light absorbing agents (L), at which the maximum value of the absorbance is shown in a wavelength range of 380 nm or more and 730 nm or less, i represents an integer of 1 to n, n represents an integer of 2 or more and denotes the number of kinds of the light absorbing agents (L), $\lambda(n+1)$ is 730 nm, and an expression of $>(1)<\lambda(2)< \ldots <\lambda(\eta)<\lambda(n+1)$ is satisfied.

9. The molded product according to claim 1, wherein the molded product comprises a light absorbing agent (A) having a wavelength at which the maximum value of the absorbance is shown in a wavelength range of 400 nm or more and less than 630 nm, as the light absorbing agent (L).

10. The molded product according to claim 9,
wherein the light absorbing agent (A) includes a light absorbing agent selected from the group consisting of an anthraquinone-based coloring agent and a phthalocyanine-based coloring agent.

11. A display device comprising:
a light source; and
the molded product according to claim 1, which is disposed to transmit light emitted from the light source.

12. A molded product which is obtained by molding a thermoplastic resin composition that comprises a methacrylic resin and two or more kinds of light absorbing agents (L) having different wavelengths at which a maximum value of an absorbance is shown in a wavelength range of 380 nm or more and 730 nm or less, the molded product comprising:
a light absorbing agent (B) having a wavelength at which the maximum value of the absorbance is shown in a wavelength range of 630 nm or more and 700 nm or less, as the light absorbing agent (L),
wherein an L* value of reflected light is 35 or less,
a total light transmittance of the molded product is 1% or less,
in a wavelength range of 430 nm or more and 700 nm or less, a wavelength at which a maximum value of a light transmittance is shown is in a wavelength range of 430 nm or more and less than 680 nm,
in a wavelength range of 430 nm or more and 700 nm or less, the maximum value of the light transmittance at a wavelength at which the maximum value of the light transmittance is shown is 0.1% or more,
the light transmittance at a wavelength of 770 nm is 5% or more, and
wherein a combination of absorbance wavelengths of the two or more kinds of light absorbing agents (L) satisfies either (i) only one adjacent pair of the absorbance wavelengths is separated by 160 nm or more and a shortest wavelength is less than 540 nm, or (ii) no adjacent pair of the absorbance wavelengths is separated by 160 nm or more, and the shortest wavelength is spaced from 380 nm by at least 160 nm.

13. The molded product according to claim 12,
wherein the light absorbing agent (B) comprises a light absorbing agent selected from the group consisting of an anthraquinone-based dye, a perinone-based dye, a methine-based dyes, and a quinophthalone-based dye.

14. The molded product according to claim 12,
wherein a total content of the light absorbing agent (B) is 0.1 parts by mass or more and 0.5 parts by mass or less with respect to 100 parts by mass of the methacrylic resin.

15. The molded product according to claim 12,
wherein the molded product does not comprise a light absorbing agent having a wavelength at which the maximum value of the absorbance is shown in a wavelength range of more than 720 nm, as the light absorbing agent (L).

16. The molded product according to claim 12,
wherein the molded product contains a light absorbing agent (A) having a wavelength at which the maximum value of the absorbance is shown in a wavelength range of 400 nm or more and less than 630 nm, as the light absorbing agent (L), and
a total content of the light absorbing agent (A) is 0.001 parts by mass or more and 1 part by mass or less with respect to 100 parts by mass of the methacrylic resin.

17. The molded product according to claim 16, wherein the light absorbing agent (A) includes a light absorbing agent selected from the group consisting of an anthraquinone-based coloring agent and a phthalocyanine-based coloring agent.

18. The molded product according to claim 12, wherein the light absorbing agent (L) satisfies any of the following conditions 1 and 2, Condition 1: only one i that satisfies Expression (5) is present, and Expression (6) is satisfied, Expression (5):

$$\lambda(i+1)-\lambda(i) \geq 160 \text{ nm} \tag{5}$$

Expression (6):

$$\lambda(1)-380 \text{ nm} < 160 \text{ nm} \tag{6}$$

Condition 2:
Expression (5) is not satisfied, and Expression (7) is satisfied, Expression (5):

$$\lambda(i+1)-\lambda(i) \geq 160 \text{ nm} \tag{5}$$

Expression (7):

$$\lambda(1)-380 \text{ nm} \geq 160 \text{ nm} \tag{7}$$

in the expression, $\lambda(i)$ represents a wavelength of a light absorbing agent (i), which is one of the light absorbing agents (L), at which the maximum value of the absorbance is shown in a wavelength range of 380 nm or more and 730 nm or less, i represents an integer of 1 to n, n represents an integer of 2 or more and denotes the number of kinds of the light absorbing agents (L), $\lambda(n+1)$ is 730 nm, and an expression of $\lambda(1)<\lambda(2)< \ldots <\lambda(n)<\lambda(n+1)$ is satisfied.

* * * * *